United States Patent
Urata et al.

(10) Patent No.: US 11,866,810 B2
(45) Date of Patent: Jan. 9, 2024

(54) ALLOY POWDER, NANOCRYSTALLINE POWDER AND MAGNETIC CORE

(71) Applicant: TOKIN CORPORATION, Sendai (JP)

(72) Inventors: Akiri Urata, Sendai (JP); Yosuke Imano, Sendai (JP); Makoto Yamaki, Sendai (JP); Naoto Onishi, Sendai (JP); Masato Kuno, Sendai (JP); Takuya Takashita, Tokyo (JP); Makoto Nakaseko, Tokyo (JP)

(73) Assignee: TOKIN CORPORATION, Miyagi (JP)

( * ) Notice: Subject to any disclaimer, the term of this patent is extended or adjusted under 35 U.S.C. 154(b) by 0 days.

(21) Appl. No.: 17/946,161

(22) Filed: Sep. 16, 2022

(65) Prior Publication Data

US 2023/0085762 A1 Mar. 23, 2023

(30) Foreign Application Priority Data

Sep. 22, 2021 (JP) .................. 2021-154591

(51) Int. Cl.
| | | |
|---|---|---|
| B22F 1/054 | (2022.01) | |
| B22F 9/08 | (2006.01) | |
| H01F 1/147 | (2006.01) | |
| H01F 27/255 | (2006.01) | |
| H01F 1/153 | (2006.01) | |
| C22C 38/02 | (2006.01) | |
| B82Y 30/00 | (2011.01) | |
| C22C 38/16 | (2006.01) | |
| C22C 38/00 | (2006.01) | |
| H01F 41/02 | (2006.01) | |

(52) U.S. Cl.
CPC .............. *C22C 38/02* (2013.01); *B22F 1/054* (2022.01); *B82Y 30/00* (2013.01); *C22C 38/002* (2013.01); *C22C 38/16* (2013.01); *H01F 41/02* (2013.01)

(58) Field of Classification Search
None
See application file for complete search history.

(56) References Cited

U.S. PATENT DOCUMENTS

| | | |
|---|---|---|
| 2007/0175545 A1 | 8/2007 | Urata et al. |
| 2010/0043927 A1 | 2/2010 | Makino |
| 2013/0278366 A1 | 10/2013 | Makino |
| 2017/0294254 A1 | 10/2017 | Urata et al. |
| 2018/0147625 A1* | 5/2018 | Takahashi ............... C22C 38/08 |
| 2021/0313101 A1* | 10/2021 | Yamamoto ............. B22F 9/002 |

FOREIGN PATENT DOCUMENTS

| | | |
|---|---|---|
| JP | 4584350 B2 | 11/2010 |
| JP | 4629807 B1 | 2/2011 |
| JP | 4849545 B2 | 10/2011 |
| JP | 5110660 B2 | 10/2012 |

* cited by examiner

*Primary Examiner* — Xiaowei Su
(74) *Attorney, Agent, or Firm* — Holtz, Holtz & Volek PC

(57) ABSTRACT

Alloy powder comprises particles. The particles include specific particles. Each of the specific particles has a surface layer on which a divided trace is formed.

18 Claims, 5 Drawing Sheets

ALLOY POWDER, NANOCRYSTALLINE POWDER AND MAGNETIC CORE

CROSS REFERENCE TO RELATED APPLICATIONS

This application is based on and claims priority under 35 U.S.C. § 119 to Japanese Patent Applications No. JP 2021-154591 filed Sep. 22, 2021, the content of which is incorporated herein in its entirety by reference.

BACKGROUND OF THE INVENTION

This invention relates to alloy powder.

For example, an existing manufacturing method of alloy powder is disclosed in JP 4584350 B (Patent Document 1), the content of which is incorporated herein by reference.

A water atomizing method and a gas atomizing method such as those shown in Patent Document 1 are known as general manufacturing methods of alloy powder.

However, the alloy powder formed by the water atomizing method or the gas atomizing method often varies in quality.

SUMMARY OF THE INVENTION

It is therefore an object of the present invention to provide homogeneous alloy powder.

The existing atomizing method is a rapid cooling method in which gas or water is used to divide molten alloy into particles and thereafter coolant liquid such as coolant water is used to rapidly cool the particles. However, the divided particles have different cooling rates from each other because of difference in particle sizes. In addition, the divided particles will fall on different points from each other with different speeds from each other. Therefore, the divided particles are cooled in atmosphere by different times from each other until they reach on the coolant liquid. The aforementioned various reasons cause the particles to be vary in quality.

In contrast, according to an aspect of the present invention, a certain mass or a flow of molten alloy is supplied to a liquid film formed of high-speed fluid made of coolant liquid. The molten alloy is prevented from being cooled while being supplied. Thereafter, the high-speed fluid divides the thus-supplied molten alloy into the particles which are simultaneously cooled by the liquid film. Thus, according to an aspect of the present invention, the molten alloy is substantially simultaneously divided and cooled so that the particles are prevented from being differently cooled from each other. As a result, homogeneous alloy powder can be obtained.

Moreover, If the divided particles are not properly cooled in the liquid film, the particles before complete solidification might hit a portion located at the bottom of the liquid film and thereby might have irregular shapes. In order to solve the aforementioned problem, the predetermined acceleration along the thickness direction of the liquid film is designed to be $2.0 \times 10^4$ G or more, and the predetermined thickness of the liquid film is designed to be 0.1 mm or more. According to the aforementioned design, proper cooling ability can be obtained, and thereby the particles will complete solidify before they hit the portion located at the bottom of the liquid film. The aforementioned design provides alloy powder which is uniform in shape to some extent. The thus-obtained alloy powder has the feature described below.

An aspect of the present invention provides alloy powder comprising particles. The particles include specific particles. Each of the specific particles has a surface layer on which a divided trace is formed.

The alloy powder of an aspect of the present invention has the specific particles each formed with the divided trace. Such specific particles are formed by a manufacturing method in which the particles are prevented from being differently cooled from each other. Accordingly, variation in quality of the alloy powder can be reduced, and the alloy powder is uniform in shape to some extent. Moreover, when nanocrystalline powder is formed by applying heat-treatment to this homogeneous alloy powder, the nanocrystalline powder is homogeneous.

An appreciation of the objectives of the present invention and a more complete understanding of its structure may be had by studying the following description of the preferred embodiment and by referring to the accompanying drawings.

Figure 1:
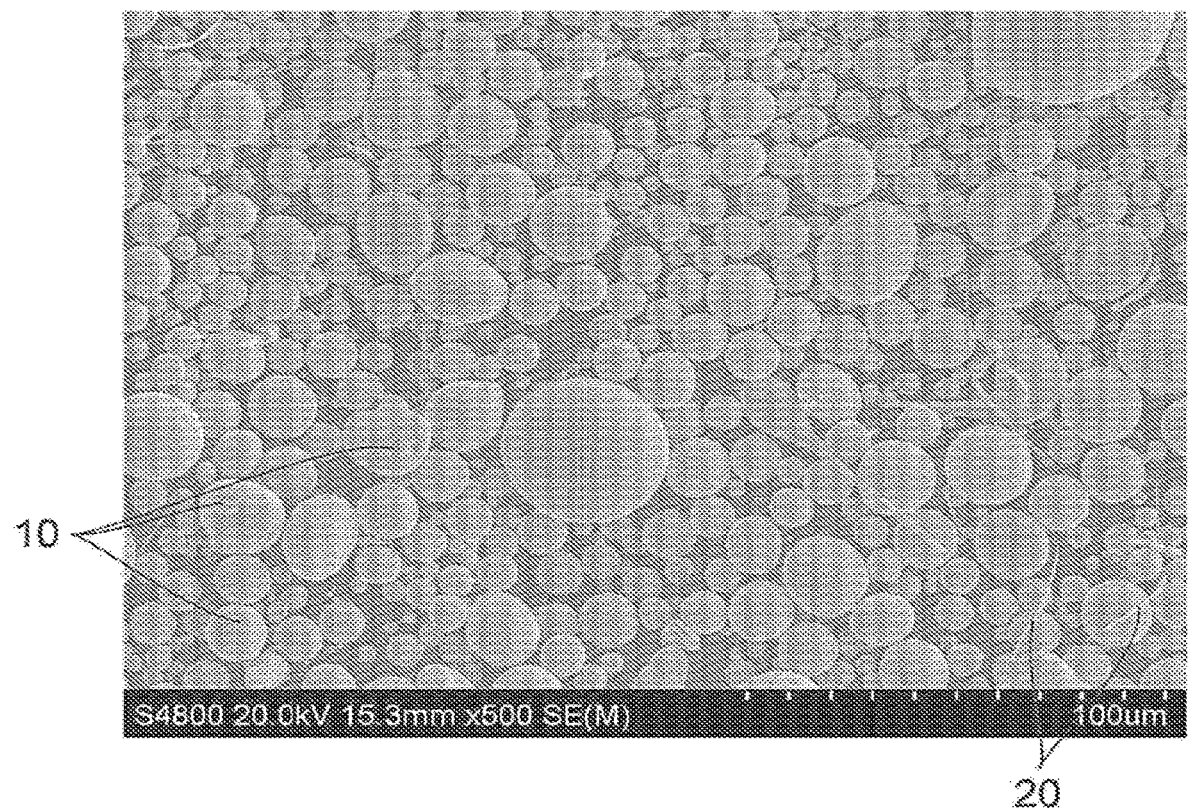
FIG. 1 is a scanning electron microscope (SEM) image showing alloy powder according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Alloy powder of an embodiment of the present invention is made by a manufacturing method in which a liquid film formed of high-speed fluid made of coolant liquid is supplied with a certain mass of molten alloy as it is, and thereafter the liquid film divides the thus-supplied molten alloy into particles which are simultaneously cooled by the liquid film. Thus, the alloy powder according to the present embodiment is made by substantially simultaneously dividing the molten alloy and cooling the divided particles. The-thus formed alloy powder has uniform characteristics. In the present embodiment, since the manufactured alloy has a powder form, oxygen may be mixed into the powder due to raw material or refractory in a process of melting the raw material. In addition, oxygen might be mixed into the powder during a rapid cooling process and a drying process. If the powder is excessively oxidized, magnetic characteristics of the powder might be degraded. Accordingly, oxygen concentration in the powder is preferred to be 5000 ppm or less and is more preferred to be 2000 ppm or less.

According to the aforementioned manufacturing method, droplet of the molten alloy is hardly cooled until it reaches on the liquid film but is rapidly cooled after it reaches on the liquid film, different from the existing atomizing method. As a result, the alloy powder according to the present embodiment has a good amorphous property. More specifically, the alloy powder according to the present embodiment has crystallinity of 4% or less. When this manufactured alloy powder is heat-treated, preferable crystals each having a diameter of 50 nm or less can be obtained. In other words, nanocrystalline powder formed by applying heat-treatment to the alloy powder of the present embodiment contains crystals each having a diameter of 50 nm or less.

Figure 2:
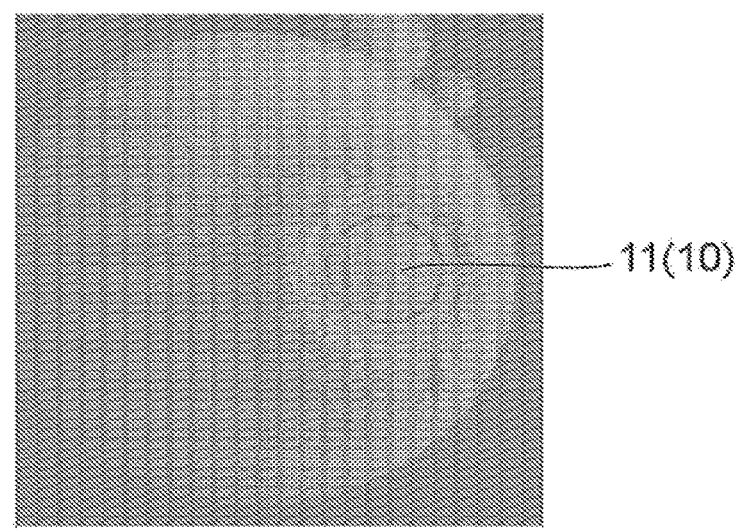
FIG. 2 is a view showing a specific particle included in the alloy powder of FIG. 1.
Figure 3:
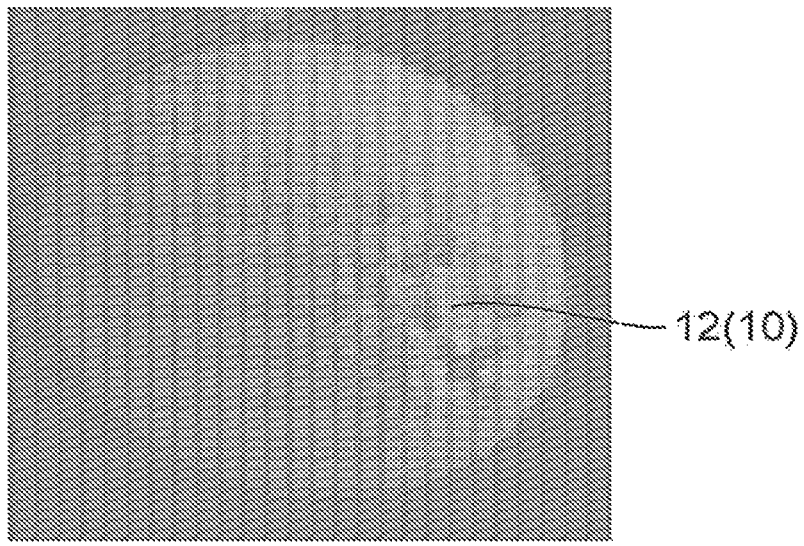
FIG. 3 is a view showing another specific particle included in the alloy powder of FIG. 1.
Figure 4:
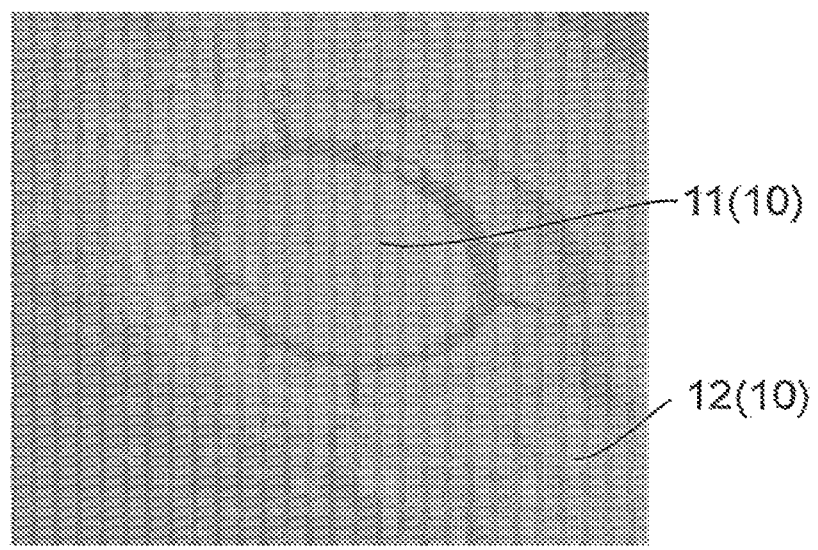
FIG. 4 is a view showing still another specific particle included in the alloy powder of FIG. 1.
Figure 6:
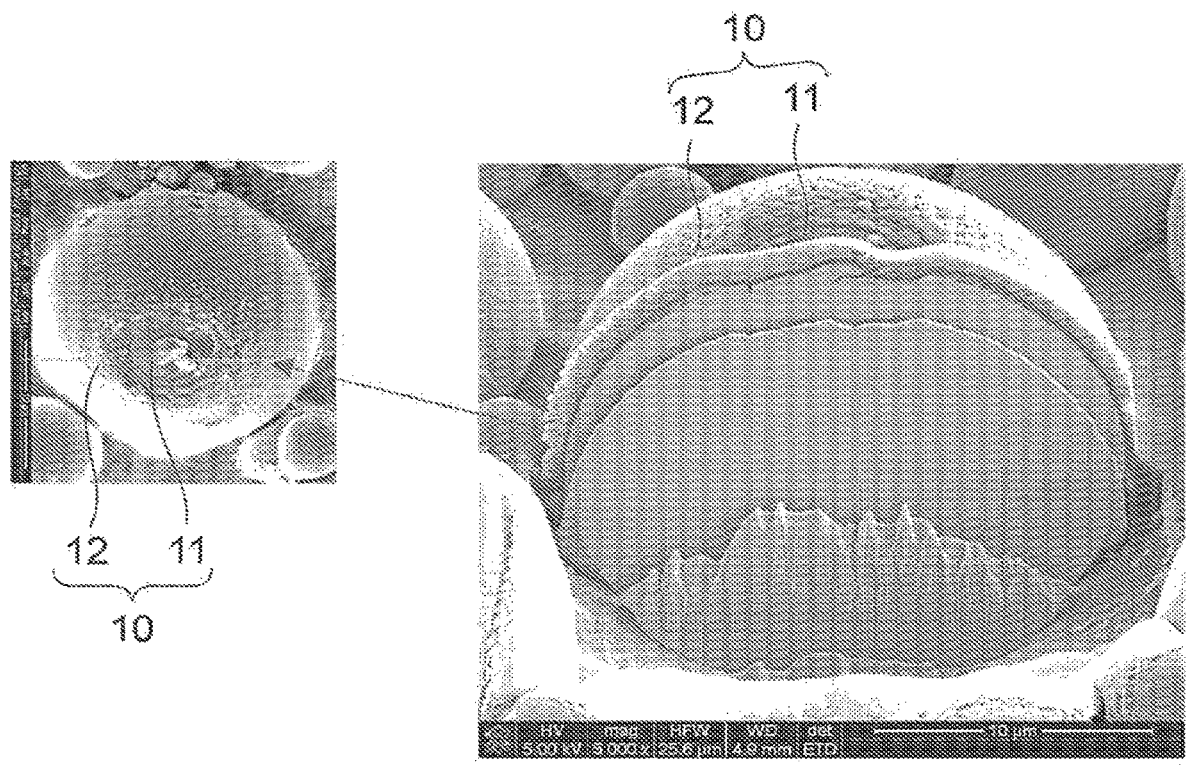
FIG. 6 is a view showing a specific particle and its cross-section.
Figure 8:
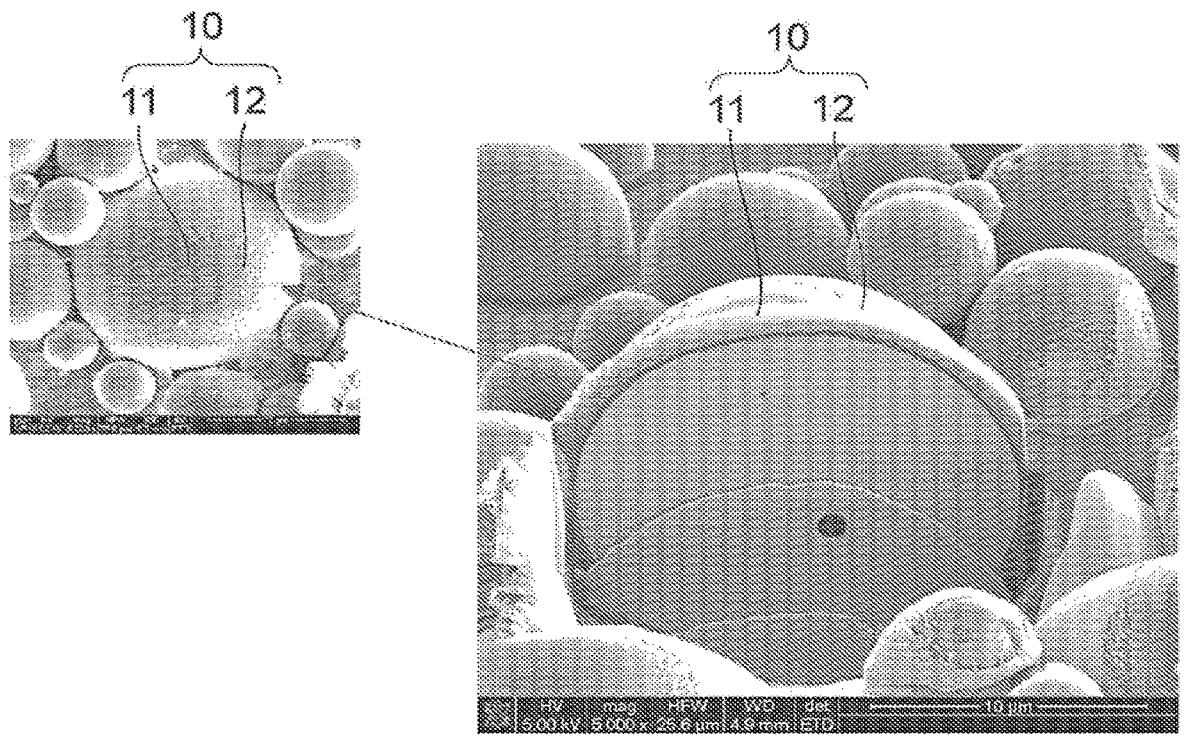
FIG. 8 is a view showing another specific particle and its cross-section.

Referring to FIG. 1, the alloy powder according to the present embodiment comprises the particles which are made by the aforementioned manufacturing method. The particles include specific particles. Each of the particles has a surface layer. In particular, each of the specific particles has the surface layer on which a divided trace 10 is formed because of the aforementioned manufacturing method. This divided trace 10 is a mark at which the molten alloy is divided by the liquid film after a mass of the molten alloy reaches on the liquid film. The divided trace 10 is considered to be formed when a part of the molten alloy temporarily stretched upon dividing changes into or becomes a sphere particle because of surface tension. The divided trace 10 has at least a crater structure 11 shown in FIG. 2, a hill-like ridge aggregate structure 12 which is an aggregate of a large number of hill-like ridges as shown in FIG. 3 or a combination of the crater structure 11 and the hill-like ridge aggregate structure 12 as shown in FIGS. 4, 6 and 8. As described above, each of the specific particles of the alloy powder according to the present embodiment has an almost sphere shape, or a sphere-like shape, except for the divided trace 10. In other words, each of the specific particles has a sphere-like shape formed with the divided trace 10. Moreover, each of the particles except the specific particles tends to have a sphere-like shape with no divided trace 10. Therefore, the alloy powder according to the present embodiment has good fluidity.

Figure 5:
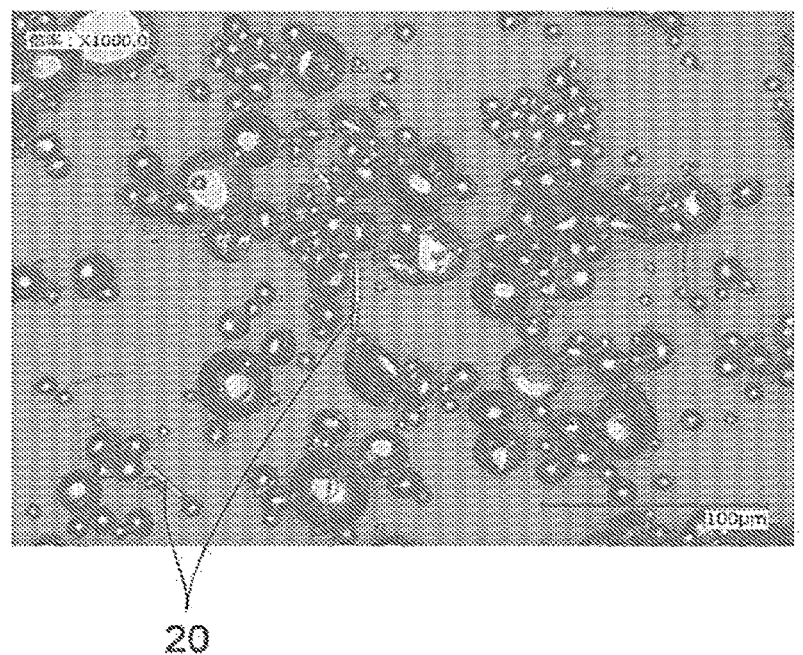
FIG. 5 is a view showing a thread-like particle.

Referring to FIGS. 1 and 5, the particles formed by the aforementioned manufacturing method not only include the specific particles each having a sphere-like shape formed with the aforementioned divided trace 10 but sometimes also include thread-like particles 20 each having a high aspect ratio. The thread-like particle 20 is considered to be formed in a process in which a part of the molten alloy is stretched in the coolant liquid and is then divided. This thread-like particle 20 hardly contributes to magnetic characteristics but is expected to increase strength and improve formability upon forming the alloy powder into a dust core.

The size of the diameter of each of the sphere-like shaped particles including the specific particles is not specifically limited. However, the diameter of each of the sphere-like shaped particles including the specific particles is preferred to be 1 to 100 μm (both inclusive). In particular, when the dust core is used for high frequency of 100 kHz or more, the diameter of each of the sphere-like shaped particles including the specific particles is preferred to be 30 μm or less.

For each of the specific particles, the divided trace 10 has a diameter less than another diameter of the specific particle. More specifically, the diameter of the divided trace 10 is about 100 μm or less when the diameter of the specific particle is about 100 μm or less. The divided trace 10 has an average diameter equal to or less than two-third of the diameter of the specific particle. In detail, the average diameter of all the divided traces 10 is equal to or less than two-third of the average diameter of all the specific particles. Each of the particles, which may be the specific particle or not, has an oxide layer located under the surface layer. In particular for the specific particles, a slug and oxide of the temporarily stretched part tend to be gathered to the divided trace 10. As a result, as shown in FIGS. 6 and 8, the oxide layer located just under the divided trace 10 has a thickness thicker than another thickness of the oxide layer located not just under the divided trace 10. In detail, the oxide layer located just under the divided trace 10 has a thickness of 30 nm or more. The oxide layer located just under the divided trace 10 often has a thickness of 100 nm or more.

Figure 7:
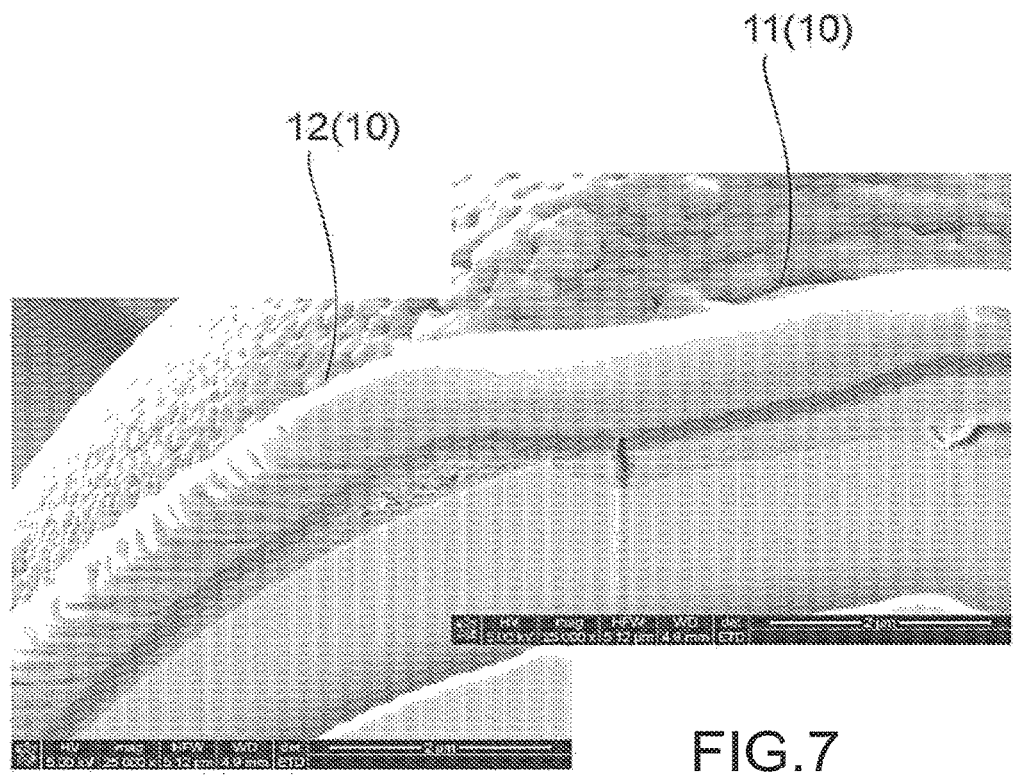
FIG. 7 is an enlarged view showing a part of the cross-section of the specific particle of FIG. 6.
Figure 9:
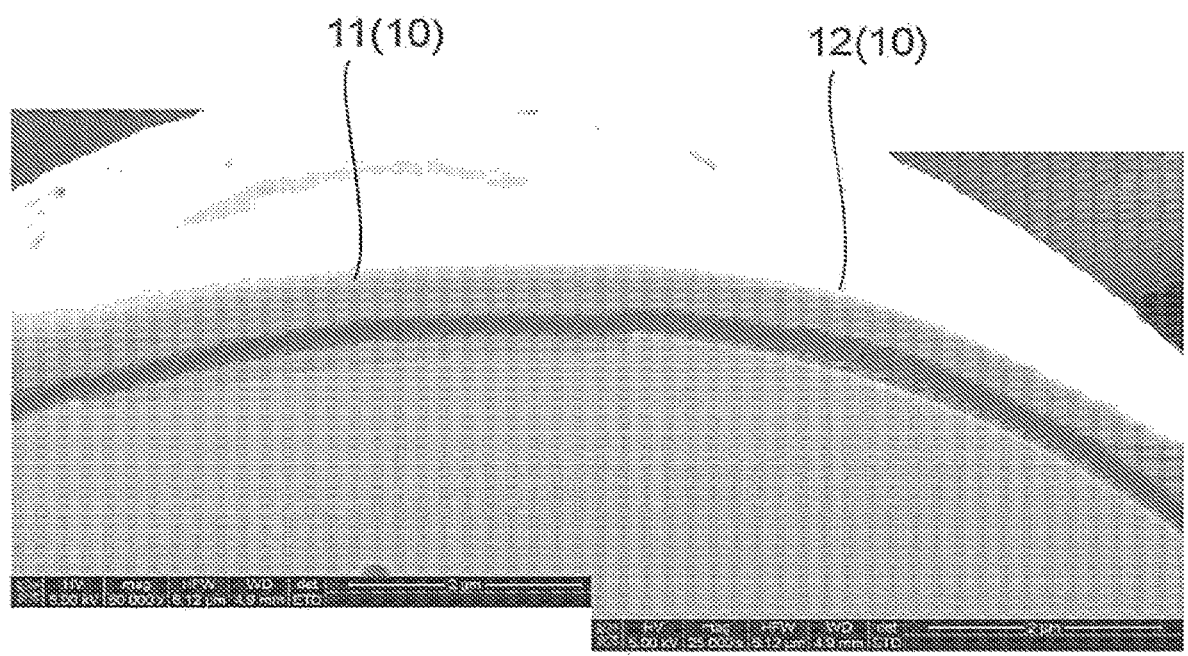
FIG. 9 is an enlarged view showing a part of the cross-section of the specific particle of FIG. 8.

Referring to FIGS. 6 and 8, when the specific particle has the divided trace 10 which is a combination of the crater structure 11 and the hill-like ridge aggregate structure 12, the hill-like ridge aggregate structure 12 is located around the crater structure 11. Referring to FIGS. 7 and 9, in this instance, the oxide layer located just under the hill-like ridge aggregate structure 12 has density lower than density of the oxide layer located just under the crater structure 11.

When the particle, which may be the specific particle or not, contains P element and contains Si element of 3 at % or less, the particle is easily shaped in a sphere-like shape. More specifically, when the particle contains a large amount of Si element, the particle is often shaped in an irregular shape. This phenomenon is considered to be caused by a process in which the surface layer is formed with a hard oxide layer such as silica layer made of $SiO_2$ in a relatively early stage before the inside of the particle is cooled, and thereby spheroidizing of the particle is stopped regardless of whether the inside of the particle has solidified or not. In contrast, when the amount of Si element is 3 at % or less, the thickness of the silica layer on a surface of the particle becomes thinner, and thereby the ratio of the irregular particles is decreased. In particular, when the amount of Si element is 1 at % or less, the particle shape tends to be more rounded. Moreover, when the molten alloy contains P element, the surface layer of the particle often contains precipitated phosphate, and thereby the particles each having a sphere-like shape can be easily obtained. This phenomenon is considered to be caused by a process in which the particle surface is formed with a soft oxide layer such as phosphate, and thereby the surface tension acting on the surface layer of the particle promotes spheroidization even while the inside of the particle is cooled. When the surface layer is constructed with the oxide layer such as phosphate, not only is the insulating property of the particles improved, but also the advantage that the particles tends to be spherical can be obtained.

When the particle contains at least one of P element and Si element, the oxide layer tends to contain at least one of P element and Si element. A tendency described below is observed in relation to the divided trace 10. When the divided trace 10 has the crater structure 11, the oxide layer just under the crater structure 11 tends to contain a compound of P element such as phosphate. On the other hand, when the divided trace 10 has the hill-like ridge aggregate structure 12, the oxide layer just under the hill-like ridge aggregate structure 12 tends to contain Si element. In particular, the oxide layer just under the hill-like ridge aggregate structure 12 tends to be high Si composition in comparison with the oxide layer located not just under the hill-like ridge aggregate structure 12.

The alloy powder of the present embodiment is preferred to be represented by composition formula of $Fe_aSi_bB_cP_d$-$Cu_eC_f$ except for inevitable impurities, wherein $80 \leq a \leq 90$, $0 \leq b \leq 3$, $3 \leq c \leq 18$, $0 \leq d \leq 17$, $0 \leq e \leq 1.2$ and $0 \leq f \leq 5$. More preferably, the alloy powder is represented by the composition formula of $Fe_aSi_bB_cP_dCu_eC_f$, wherein $83 \leq a \leq 87$, $0 \leq b \leq 1$, $5 \leq c \leq 12$, $4 \leq d \leq 10$, $0.4 \leq e \leq 0.9$ and $0 \leq f \leq 1$. In the aforementioned composition formula, not more than 3 at % of Fe may be replaced with at least one element selected from O, N, S, Na, Mg, Al, K, Ca, Ti, V, Cr, Mn, Zr, Hf, Nb, Ta, Mo, W, Ag, Au, Zn, Sn, Sb, Bi and rare-earth elements. Each of Al element and Ti element is expected to improve corrosion resistance characteristics of the alloy powder when a small amount thereof is contained. However, the particle tends to be irregular shape as the amount of each of Al element and Ti element is increased. The total amount of Al element and Ti element is preferred to be 0.1 at % or less when the alloy powder is required to have bulk density as high as possible. When the total amount of Al element and Ti element is 0.01 at % or less, the particle easily has a sphere-like shape and has good amorphous property and good magnetic characteristics. Moreover, In the aforementioned composition formula, not more than 20 at % of Fe may be replaced with at least one element selected from Co and Ni. Each of Co element and Ni element provides magnetism and prevents magnetic characteristics from being lowered.

Fe element contained in the aforementioned composition formula provides magnetism. As Fe amount is higher, the alloy powder has higher saturation magnetic flux density, and thereby the alloy powder can be manufactured at low cost. Fe amount is preferred to be 80 at % or more so that saturation magnetic flux density of 1.6 T or more can be obtained. Fe amount is more preferred to be 83 at % or more so that saturation magnetic flux density of 1.7 T or more can be obtained. However, when Fe amount is more than 90 at %, melting point becomes high, and amorphous-forming ability is lowered. As a result, high-quality particles are hardly made. Fe amount is preferred to be 90 at % or less so that melting point can be reduced. Fe amount is preferred to be 87 at % or less so that amorphous-forming ability can be improved. Fe amount is preferred to be 85.5 at % or less so that good amorphous particles can be obtained.

The aforementioned alloy powder shows two exothermic peaks during crystallization. In other words, the alloy powder exhibits two-step behaviors during crystallization. In connection with these behaviors, Si in the aforementioned composition formula tends to expand $\Delta T$ and can reduce precipitation of Fe-compounds, wherein $\Delta T$ is a temperature difference $(Tx_2-Tx_1)$ between the first crystallization start temperature $(Tx_1)$ and the second crystallization start temperature $(Tx_2)$. When the composition formula includes a small amount of Si element, amorphous-forming ability can be improved. However, when the amount of Si is excessive, amorphous-forming ability will be lowered, and the particles will have irregular shapes. From the aforementioned viewpoint, Si amount is preferred to be 3 at % or less. Si amount is preferred to be 1 at % or less so that the particles each having a sphere-like shape can be easily obtained.

B element contained in the aforementioned composition formula is an essential element of the alloy powder. B amount should be 3 at % or more. B amount is preferred to be 5 at % or more so that amorphous-forming ability can be improved. B amount is preferred to be 18 at % or less so that saturation magnetic flux density can be prevented from being lowered. B amount is preferred to be 12 at % or less so that amorphous-forming ability can be improved. Moreover, if the alloy powder includes an excessively large amount of B element, heat treatment for nano-crystallization will be difficult because of coarsened grain size and exothermic heat generated upon crystallization. Accordingly, the B amount is preferred to be 10 at % or less.

P element contained in the aforementioned composition formula contributes to improving amorphous-forming ability, to making grain size small, to spheroidizing the particle, to improving corrosion resistance, to lowering melting point of alloy, to lowering heat-treatment temperature, etc. However, when P amount is excessively high, the crystallization temperature range of $\Delta T$ $(Tx_2-Tx_1)$ becomes narrow, and thereby nano-crystallization of $\alpha$-Fe becomes difficult. Accordingly, P amount is preferred to be 18 at % or less. P amount is preferred to be 10 at % or less so that saturation magnetic flux density can be improved. Moreover, from a viewpoint of suppressing crystal grain growth, P amount is preferred to be 4 at % or more. In particular, when a large size magnetic core is formed of the aforementioned alloy powder, P amount is preferred to be 5 at % or more.

Cu element contained in the aforementioned composition formula is an element which is precipitated in clusters during crystallization of $\alpha$-Fe to accelerate nano-crystallization. In addition, when Cu is contained, crystallization temperature can be decreased, and thereby heat-treatment for nano-crystallization can be easily performed. Accordingly, Cu amount is preferred to be 0.4 at % or more and is more preferred to be 0.55 at % or more. However, when Cu amount is excessively high, amorphous-forming ability will be lowered. Accordingly, Cu amount is preferred to be 1.2 at % or less and is more preferred to be 0.9 at % or less.

C element contained in the aforementioned composition formula contributes to improving amorphous-forming ability, in particular, to lowering crystallinity and to enabling material cost to be lowered. However, C tends to induce growth of $\alpha$-Fe nanocrystals. Accordingly, C amount is preferred to be 5 at % or less and is more preferred to be 1 at % or less so that core loss can be lowered.

Each of the alloy powder and the nanocrystalline powder described above has high fluidity. Therefore, a magnetic core having superior characteristics can be formed by using the alloy powder or the nanocrystalline powder described above. When the alloy powder or the nanocrystalline powder described above is used, two or more kinds of alloy powder having average diameters different from each other may be mixed to each other, and two or more kinds of alloy powder having composition formulas different from each other may be mixed to each other. When the aforementioned mixed alloy powder is used, excessive increase of heat treatment temperature can be prevented, and/or powder fluidity can be further improved.

Hereafter, more specific explanation will be made about the present embodiment with reference to Examples.

Examples 1 to 26 and Comparative Examples 1 to 4

Alloy powder was made of molten alloy each having composition shown in Table 1 below. Shapes, structures and characteristics of the particles of the alloy powder were measured. The measurement result is shown in Tables 2 to 4. As for Examples 1 to 26 and Comparative Example 1, a liquid film formed of high-speed fluid made of coolant liquid was supplied with a certain mass of molten alloy as it is, and thereafter the liquid film divided the thus-supplied molten alloy into particles which were simultaneously cooled by the liquid film. As for Comparative Examples 2 and 4, water atomizing method was used to make particles. As for Comparative Example 3, gas atomizing method was used to make particles. The measurement result of the thus-made alloy powder is shown in Tables 2 to 4. "First structure" in Table 2 means the crater structure of the divided trace, and "observed" means that the alloy powder includes the specific particles each formed with the divided trace. "Second structure" in Table 2 means the hill-like ridge aggregate structure of the divided trace, and "observed" means that the alloy powder includes the specific particles each formed with the hill-like ridge aggregate structure. "Ratio of divided traces" in Table 4 is a ratio of the specific particles each formed with the divided trace relative to all the particles.

TABLE 1

| | composition (at %) |
|---|---|
| Comparative Example 1 | $Fe_{82.9}Si_4B_6P_{6.5}Cu_{0.6}$ |
| Example 1 | $Fe_{80.9}Si_{3.5}B_6P_8Cr_1Cu_{0.6}$ |
| Example 2 | $Fe_{84.2}Si_{0.1}B_6P_9Cu_{0.7}$ |
| Example 3 | $Fe_{84.3}B_6P_9Cu_{0.7}$ |
| Example 4 | $Fe_{84.3}Si_1B_{10}P_4Cu_{0.7}$ |
| Example 5 | $Fe_{84.3}Si_3B_7P_5Cu_{0.7}$ |
| Example 6 | $Fe_{84.3}B_{11}P_4Cu_{0.7}$ |
| Example 7 | $Fe_{84.3}C_1B_{10}P_4Cu_{0.7}$ |
| Comparative Example 2 | $Fe_{73}Si_{10}B_{15}Cr_2$ |
| Comparative Example 3 | $Fe_{73}Si_{10}B_{15}Cr_2$ |
| Comparative Example 4 | $Fe_{84.3}B_6P_9Cu_{0.7}$ |
| Example 8 | $Fe_{84.0}Si_{0.3}B_9P_6Cu_{0.7}$ |
| Example 9 | $Fe_{84.3}Si_{2.8}B_{8.2}P_4Cu_{0.7}$ |
| Example 10 | $Fe_{84.3}B_{14}P_1Cu_{0.7}$ |
| Example 11 | $Fe_{85.1}B_9P_5Cu_{0.9}$ |
| Example 12 | $Fe_{86.5}Si_{0.5}B_{7.5}P_5Cu_{0.5}$ |
| Example 13 | $Fe_{83.3}B_9P_6Cu_{0.7}Cr_1$ |
| Example 14 | $Fe_{83.3}B_9P_6Cu_{0.7}Nb_1$ |
| Example 15 | $Fe_{84.3}B_{15}Cu_{0.7}$ |
| Example 16 | $Fe_{83.5}Si_{0.3}B_9P_6Cu_{1.2}$ |
| Example 17 | $Fe_{84.2}B_9P_6Cu_{0.7}C_{0.1}$ |
| Example 18 | $Fe_{83.3}B_9P_6Cu_{0.7}C_1$ |
| Example 19 | $Fe_{84.2}B_6P_9Cu_{0.7}Mn_{0.1}$ |
| Example 20 | $Fe_{83.3}B_6P_9Cu_{0.7}Mn_1$ |
| Example 21 | $Fe_{84.0}Ni_{0.3}B_6P_9Cu_{0.7}$ |
| Example 22 | $Fe_{84.0}Co_{0.3}B_6P_9Cu_{0.7}$ |
| Example 23 | $Fe_{84.29}B_6P_9Cu_{0.7}Al_{0.01}$ |
| Example 24 | $Fe_{83.8}B_6P_9Cu_{0.7}Al_{0.5}$ |
| Example 25 | $Fe_{84.295}B_6P_9Cu_{0.7}Ti_{0.005}$ |
| Example 26 | $Fe_{84.21}B_6P_9Cu_{0.7}Ti_{0.09}$ |

TABLE 2

| | particle diameter [μm] | crystallinity [%] | first structure | second structure |
|---|---|---|---|---|
| Comparative Example 1 | 18 | 1.1 | not-observed | not-observed |
| Example 1 | 35 | 0 | observed | not-observed |
| Example 2 | 16 | 3.4 | observed | not-observed |
| Example 3 | 30 | 0.4 | observed | observed |
| Example 4 | 28 | 0 | not-observed | observed |
| Example 5 | 32 | 0.5 | not-observed | observed |
| Example 6 | 28 | 0.8 | observed | observed |
| Example 7 | 26 | 1.6 | observed | observed |
| Comparative Example 2 | 8 | 1 | not-observed | not-observed |
| Comparative Example 3 | 65 | 58 | not-observed | not-observed |
| Comparative Example 4 | 11 | 66 | not-observed | not-observed |
| Example 8 | 21 | 0 | observed | observed |
| Example 9 | 26 | 2.2 | not-observed | observed |
| Example 10 | 25 | 1.8 | observed | observed |
| Example 11 | 23 | 2.5 | observed | observed |
| Example 12 | 24 | 3.8 | observed | observed |
| Example 13 | 26 | 0 | observed | observed |
| Example 14 | 23 | 0 | observed | observed |
| Example 15 | 18 | 3.2 | observed | observed |
| Example 16 | 51 | 0.5 | observed | not-observed |
| Example 17 | 28 | 1.8 | observed | observed |
| Example 18 | 27 | 0.3 | observed | observed |
| Example 19 | 29 | 0.5 | observed | observed |
| Example 20 | 26 | 0.3 | observed | observed |
| Example 21 | 31 | 0.6 | observed | observed |
| Example 22 | 33 | 0.7 | observed | observed |
| Example 23 | 27 | 0 | observed | observed |
| Example 24 | 32 | 2.3 | observed | not-observed |
| Example 25 | 28 | 0.6 | observed | observed |
| Example 26 | 31 | 1.4 | observed | not-observed |

TABLE 3

| | ratio of divided traces [%] | size of divided trace [μm] | particle shape |
|---|---|---|---|
| Comparative Example 1 | 0 | 0 | bad |
| Example 1 | 0.5 | 5 | good |
| Example 2 | 6 | 9 | excellent |
| Example 3 | 24 | 6 | excellent |
| Example 4 | 6 | 8 | excellent |
| Example 5 | 1 | 12 | excellent |
| Example 6 | 21 | 8 | excellent |
| Example 7 | 16 | 6 | excellent |
| Comparative Example 2 | 0 | 0 | excellent |
| Comparative Example 3 | 0 | 0 | excellent |
| Comparative Example 4 | 0 | 0 | excellent |
| Example 8 | 11 | 4 | excellent |
| Example 9 | 2 | 14 | good |
| Example 10 | 15 | 4 | excellent |
| Example 11 | 18 | 3 | excellent |
| Example 12 | 8 | 8 | excellent |
| Example 13 | 22 | 6 | excellent |
| Example 14 | 18 | 3 | excellent |
| Example 15 | 11 | 5 | excellent |
| Example 16 | 44 | 3 | excellent |
| Example 17 | 12 | 3 | excellent |
| Example 18 | 8 | 4 | excellent |
| Example 19 | 23 | 5 | excellent |
| Example 20 | 24 | 5 | excellent |
| Example 21 | 18 | 6 | excellent |
| Example 22 | 21 | 9 | excellent |
| Example 23 | 19 | 6 | excellent |
| Example 24 | 2 | 18 | excellent |
| Example 25 | 13 | 7 | excellent |
| Example 26 | 8 | 3 | excellent |

TABLE 4

| | bulk density [g/cc] | tap density [g/cc] | crystal diameter [nm] | Bs [T] | Hc [Oe] |
|---|---|---|---|---|---|
| Comparative Example 1 | 3.2 | 3.4 | 25 | 1.65 | 1 |
| Example 1 | 3.7 | 4.1 | 27 | 1.60 | 1 |
| Example 2 | 3.7 | 4.3 | 20 | 1.70 | 4 |
| Example 3 | 3.9 | 4.4 | 20 | 1.70 | 1 |
| Example 4 | 4.1 | 4.4 | 32 | 1.75 | 1 |
| Example 5 | 3.7 | 4.2 | 30 | 1.77 | 2 |
| Example 6 | 4.2 | 4.5 | 31 | 1.77 | 1 |
| Example 7 | 4.1 | 4.4 | 41 | 1.75 | 2 |

TABLE 4-continued

|  | bulk density [g/cc] | tap density [g/cc] | crystal diameter [nm] | Bs [T] | Hc [Oe] |
|---|---|---|---|---|---|
| Comparative Example 2 | 3.4 | 3.8 | none | 1.35 | 2 |
| Comparative Example 3 | 4.5 | 4.7 | none | 1.34 | 25 |
| Comparative Example 4 | 3.6 | 4.0 | compound phase | 1.75 | 14 |
| Example 8 | 4.2 | 4.5 | 28 | 1.75 | 1 |
| Example 9 | 3.9 | 4.2 | 33 | 1.75 | 1 |
| Example 10 | 4.1 | 4.5 | 44 | 1.80 | 2 |
| Example 11 | 4.2 | 4.5 | 30 | 1.79 | 2 |
| Example 12 | 4.2 | 4.5 | 35 | 1.83 | 5 |
| Example 13 | 4.1 | 4.5 | 28 | 1.67 | 1 |
| Example 14 | 4.1 | 4.3 | 22 | 1.65 | 1 |
| Example 15 | 4.1 | 4.5 | 48 | 1.80 | 3 |
| Example 16 | 4.4 | 4.6 | 29 | 1.71 | 1 |
| Example 17 | 4.2 | 4.5 | 20 | 1.75 | 1 |
| Example 18 | 4.2 | 4.5 | 23 | 1.72 | 1 |
| Example 19 | 4.2 | 4.4 | 24 | 1.68 | 1 |
| Example 20 | 4.2 | 4.5 | 26 | 1.66 | 1 |
| Example 21 | 4.2 | 4.4 | 24 | 1.70 | 2 |
| Example 22 | 4.1 | 4.3 | 25 | 1.71 | 2 |
| Example 23 | 4.2 | 4.4 | 24 | 1.69 | 1 |
| Example 24 | 3.9 | 4.1 | 22 | 1.68 | 3 |
| Example 25 | 4.1 | 4.3 | 24 | 1.69 | 1 |
| Example 26 | 4 | 4.2 | 21 | 1.69 | 2 |

Referring to Tables 2 and 3, the alloy powder of each of Examples 1 to 26 made by the manufacturing method of the present embodiment includes the specific particle which is formed with the crater structure (first structure) or the hill-like ridge aggregate structure (second structure) and which has an almost sphere shape. In contrast, the alloy powder of each of Comparative Examples 2 to 4 made by the water atomizing method or the gas atomizing method does not include the specific particle which is formed with such divided trace. The alloy powder of each of Example 1 and Comparative Example 1 is made by the manufacturing method of the present embodiment, but Example 1 and Comparative Example 1 have Si amounts different from each other. Si amount of the alloy powder of Comparative Example 1 is 4 at %, and thereby the molten alloy is not properly divided into particles, and the particles thereof have irregular shapes. In contrast, Si amount of the alloy powder of Example 1 is 3.5 at % which is lower than that of Comparative Example, and thereby the molten alloy is divided into particles. However, the alloy powder of Example 1 includes many particles each having an irregular shape and is unsuitable for the purpose of obtaining sphere-like shaped specific particles.

According to Table 4, the alloy powder of each of Examples 1 to 26, which includes the specific particles each formed with the divided trace, has bulk density of 3.7 g/cc or more and has tap density of 4.0 g/cc or more. In addition, the alloy powder of each of Examples 1 to 26 has saturation magnetic flux density of 1.6 T or more and coercivity of 5 Oe or less. This alloy powder can be used to form a magnetic core which has superior magnetic characteristics.

Examples 31 to 36 and Comparative Examples 31 to 33

Alloy powder of was made of molten alloy each having composition shown in Table 5 below. Distribution of particle sizes and characteristics of the particles of the alloy powder were measured. As for Examples 31 to 36, a liquid film formed of high-speed fluid made of coolant liquid was supplied with a certain mass of molten alloy as it is, and thereafter the liquid film divided the thus-supplied molten alloy into particles which were simultaneously cooled by the liquid film. As for Comparative Examples 31 and 32, water atomizing method was used to make particles. As for Comparative Example 33, gas atomizing method was used to make particles. The measurement result of the thus-made alloy powder is shown in Tables 5 and 6.

TABLE 5

|  | composition (at %) | D50 (μm) | D50/D10 | D90/D10 | rust |
|---|---|---|---|---|---|
| Comparative Example 31 | $Fe_{84.3}B_6P_9Cu_{0.7}$ | 11 | 2.9 | 6.3 | bad |
| Comparative Example 32 | FeSiBCr amorphous | 9 | 2.7 | 5.7 | good |
| Comparative Example 33 | FeSiBCr amorphous | 65 | 2.5 | 4.0 | excellent |
| Example 31 | $Fe_{85.3}B_9P_5Cu_{0.7}$ | 15 | 1.8 | 4.0 | excellent |
| Example 32 | $Fe_{84.3}B_9P_6Cu_{0.7}$ | 20 | 2.2 | 4.8 | excellent |
| Example 33 | $Fe_{84.3}Si_{0.5}B_{10}P_{4.5}Cu_{0.7}$ | 23 | 2.3 | 5.4 | excellent |
| Example 34 | $Fe_{85.3}B_9P_5Cu_{0.7}$ | 30 | 2.2 | 4.2 | excellent |
| Example 35 | $Fe_{84.3}B_{10}P_{4.5}C_{0.5}Cu_{0.7}$ | 36 | 2.2 | 4.4 | excellent |
| Example 36 | $Fe_{83.3}Si_{1.5}B_9P_{4.5}Cu_{0.7}Cr_1$ | 52 | 2.1 | 5.9 | excellent |

TABLE 6

|  | yield (%) | crystallinity (%) | Hc (Oe) | particle shape |
|---|---|---|---|---|
| Comparative Example 31 | 80 | 16 | 7 | bad |
| Comparative Example 32 | 60 | 3 | 3 | excellent |
| Comparative Example 33 | 80 | 65 | 16 | excellent |
| Example 31 | 80 | 0 | 1 | excellent |
| Example 32 | 85 | 1 | 1 | excellent |
| Example 33 | 95 | 1 | 1 | excellent |
| Example 34 | 85 | 2 | 2 | excellent |
| Example 35 | 80 | 1 | 1 | excellent |
| Example 36 | 75 | 2 | 1 | good |

Referring to Tables 5 and 6, the alloy powder of each of Examples 31 to 36 has low crystallinity of 2% or less and has good coercivity of 2 Oe or less. In contrast, the alloy powder of each of Comparative Examples 31 and 33 has high crystallinity and has large coercivity. Moreover, the alloy powder of each of Examples 31 to 36 has small average particle size. In detail, the alloy powder of each of Examples 31 to 36 has D50/D10 of 2.5 or less and D90/D10 between 4 and 6 (both inclusive). When the alloy powder has D90/D10 of less than 4, yield of the alloy powder tends to be lowered. When the alloy powder has D90/D10 of more than 6, the alloy powder includes large number of irregular shape particles. As a result, the alloy powder has bad fluidity, and the magnetic core formed of this alloy powder has bad insulation characteristics. Therefore, D90/D10 is preferred to be between 4 and 6 (both inclusive) similar to that of the alloy powder of each of Examples 31 to 36. The alloy powder of each of Comparative Examples 31 and 32 similarly has small average particle size, but it has large D50/D10. Thus, the alloy powder of each of Comparative Examples 31 and 32 includes a large ratio of fine particles, and thereby rust is easily generated. The alloy powder of Comparative Example 33 has a large average particle size.

What is claimed is:

1. An alloy powder comprising particles, wherein:
   the particles include specific particles;
   each of the specific particles has a surface layer on which a divided trace is formed, the divided trace being a mark at which molten alloy is divided;
   each of the specific particles has an oxide layer located under the surface layer, wherein the oxide layer located just under the divided trace has a thickness that is thicker than a thickness of the oxide layer located not just under the divided trace; and
   the divided trace is a combination of a crater structure and a hill-like ridge aggregate structure located around the crater structure, the hill-like ridge aggregate structure being an aggregate of a plurality of hill-like ridges.

2. The alloy powder as recited in claim 1, wherein the divided trace has a diameter that is less than a diameter of the specific particle.

3. The alloy powder as recited in claim 2, wherein the divided trace has an average diameter that is equal to or less than two thirds of the diameter of the specific particle.

4. The alloy powder as recited in claim 1, wherein the oxide layer located just under the hill-like ridge aggregate structure has a density that is lower than a density of the oxide layer located just under the crater structure.

5. The alloy powder as recited in claim 1, wherein the oxide layer located just under the divided trace has a thickness of 30 nm or more.

6. The alloy powder as recited in claim 1, wherein:
   the specific particle contains P element and contains Si element; and
   the amount of Si element is 3 at % or less.

7. The alloy powder as recited in claim 6, wherein the specific particle contains Si element of 1 at % or less.

8. The alloy powder as recited in claim 6, wherein the surface layer contains phosphate.

9. The alloy powder as recited in claim 6, wherein the oxide layer contains at least one of P element and Si element.

10. The alloy powder as recited in claim 1, wherein the alloy powder is represented by composition formula of $Fe_aSi_bB_cP_dCu_eC_f$ except for inevitable impurities, wherein 80 at %≤a≤90 at %, 0 at %≤b≤3 at %, 3 at %≤c≤18 at %, 0 at %≤d≤17 at %, 0 at %≤e≤1.2 at %, and 0 at %≤f≤5 at %.

11. The alloy powder as recited in claim 1, wherein the alloy powder is represented by composition formula of $Fe_aSi_bB_cP_dCu_eC_f$ except for inevitable impurities, wherein 80 at %≤a≤90 at %, 0 at %≤b≤3 at %, 3 at %≤c≤18 at %, 0 at %≤d≤17 at %, 0 at %≤e≤1.2 at %, and 0 at %≤f≤5 at %, and not more than 3 at % of Fe is replaced with at least one element selected from the group consisting of O, N, S, Na, Mg, Al, K, Ca, Ti, V, Cr, Mn, Zr, Hf, Nb, Ta, Mo, W, Ag, Au, Zn, Sn, Sb, Bi and rare-earth elements.

12. The alloy powder as recited in claim 1, wherein the alloy powder is represented by composition formula of $Fe_aSi_bB_cP_dCu_eC_f$ except for inevitable impurities, wherein 80 at %≤a≤90 at %, 0 at %≤b≤3 at %, 3 at %≤c≤18 at %, 0 at %≤d≤17 at %, 0 at %≤e≤1.2 at %, and 0 at % f 5 at %, and not more than 20 at % of Fe is replaced with at least one element selected from the group consisting of Co and Ni.

13. The alloy powder as recited in claim 1, wherein the alloy powder has crystallinity of 4% or less.

14. The alloy powder as recited in claim 1, wherein each of the specific particles has a sphere-like shape formed with the divided trace.

15. A nanocrystalline powder formed by applying heat-treatment to the alloy powder of claim 1, wherein the nanocrystalline powder contains a crystal having a diameter of 50 nm or less.

16. A magnetic core formed by using the alloy powder of claim 1.

17. A magnetic core formed by using the nanocrystalline powder of claim 15.

18. The alloy powder as recited in claim 1, wherein the particles include thread-like particles each having a higher aspect ratio than the other particles in the alloy powder.

* * * * *